US00RE34815E

United States Patent [19]

Byrne

[11] E Patent Number: Re. 34,815

[45] Reissued Date of Patent: Jan. 3, 1995

[54] FLEXIBLE FLAIL TRIMMER WITH COMBINED GUIDE AND GUARD

[76] Inventor: Steven E. Byrne, 10787 Big Bone Church Rd., Union, Ky. 41091

[21] Appl. No.: 995,130

[22] Filed: Dec. 22, 1992

Related U.S. Patent Documents

Reissue of:

[64] Patent No.: 5,115,870
Issued: May 26, 1992
Appl. No.: 636,193
Filed: Dec. 31, 1990

[51] Int. Cl.[6] ..... A01D 34/84

[52] U.S. Cl. ..... 172/15; 172/17; 172/45; 56/12.7; 56/320.1; 30/DIG. 5

[58] Field of Search ..... 172/13–15, 172/17, 508, 510, 45, 112; 30/DIG. 5, 286; 56/320.1, 320.2, 12.7, DIG. 24, DIG. 20, 17.4

[56] References Cited

U.S. PATENT DOCUMENTS

| | | |
|---|---|---|
| 2,263,431 | 11/1941 | White . |
| 2,707,859 | 5/1955 | Walker . |
| 2,708,335 | 5/1955 | Newton . |
| 2,725,813 | 12/1955 | Stoeber . |
| 2,832,184 | 4/1958 | Beuerle . |
| 2,952,110 | 9/1960 | Blanchard . |
| 3,006,421 | 10/1961 | Feilbach . |
| 3,208,209 | 9/1965 | Dunlap et al. . |
| 3,656,286 | 4/1972 | Glunk et al. . |
| 3,708,967 | 1/1973 | Geist et al. . |
| 3,788,049 | 1/1974 | Ehrlich . |
| 3,831,278 | 8/1974 | Voglesonger . |
| 3,872,930 | 3/1975 | Campbell . |
| 4,091,536 | 5/1978 | Bartholomew . |
| 4,107,841 | 8/1978 | Rebhun . |
| 4,118,865 | 10/1978 | Jacyno et al. . |
| 4,190,954 | 3/1980 | Walto . |
| 4,202,094 | 5/1980 | Kalmar . |
| 4,224,784 | 9/1980 | Hansen et al. . |
| 4,268,964 | 5/1981 | Moore . |
| 4,442,659 | 4/1984 | Enbusk . |
| 4,587,800 | 5/1986 | Jimenez . |
| 4,641,431 | 2/1987 | Leming et al. . |
| 4,679,385 | 7/1987 | Carmine . |
| 4,712,363 | 12/1987 | Claborn . |
| 4,756,148 | 7/1988 | Gander et al. . |
| 4,803,831 | 2/1989 | Carmine . |
| 4,914,899 | 4/1990 | Carmine . |
| 5,009,369 | 4/1991 | Iwaszkowiec . |
| 5,010,720 | 4/1991 | Corsi ..... 56/DIG. 24 |
| 5,029,435 | 7/1991 | Buchanan . |

FOREIGN PATENT DOCUMENTS

| | | |
|---|---|---|
| 157734 | 7/1954 | Australia . |
| 3285 | 4/1969 | Germany . |
| 3506717 | 8/1986 | Germany . |

OTHER PUBLICATIONS

Advertisement, "Trim-A-Lawn", Trim-A-Lawn Corporation, 1031 Park Drive #2, Indian Harbour Beach, Fla. 32927, 1991.

*Primary Examiner*—Randolph A. Reese
*Assistant Examiner*—Spencer Warnick
*Attorney, Agent, or Firm*—Wood, Herron & Evans

[57] ABSTRACT

A flexible flail trimmer for conventional trimming of grass, weeds and the like and for edging of sidewalks has a combined guide and guard rotatably mounted inboard of the trimmer cutting head. The guide and guard provides dynamic trimmer indexing on a sidewalk edge for guiding the trimmer vertically and horizontally to deliver a uniform, aesthetically pleasing turf edge. The combined guide and guard does not inhibit trimming of grass and weeds in the conventional trimming manner, and actually enhances the user's visualization and performance of such trimming.

34 Claims, 2 Drawing Sheets

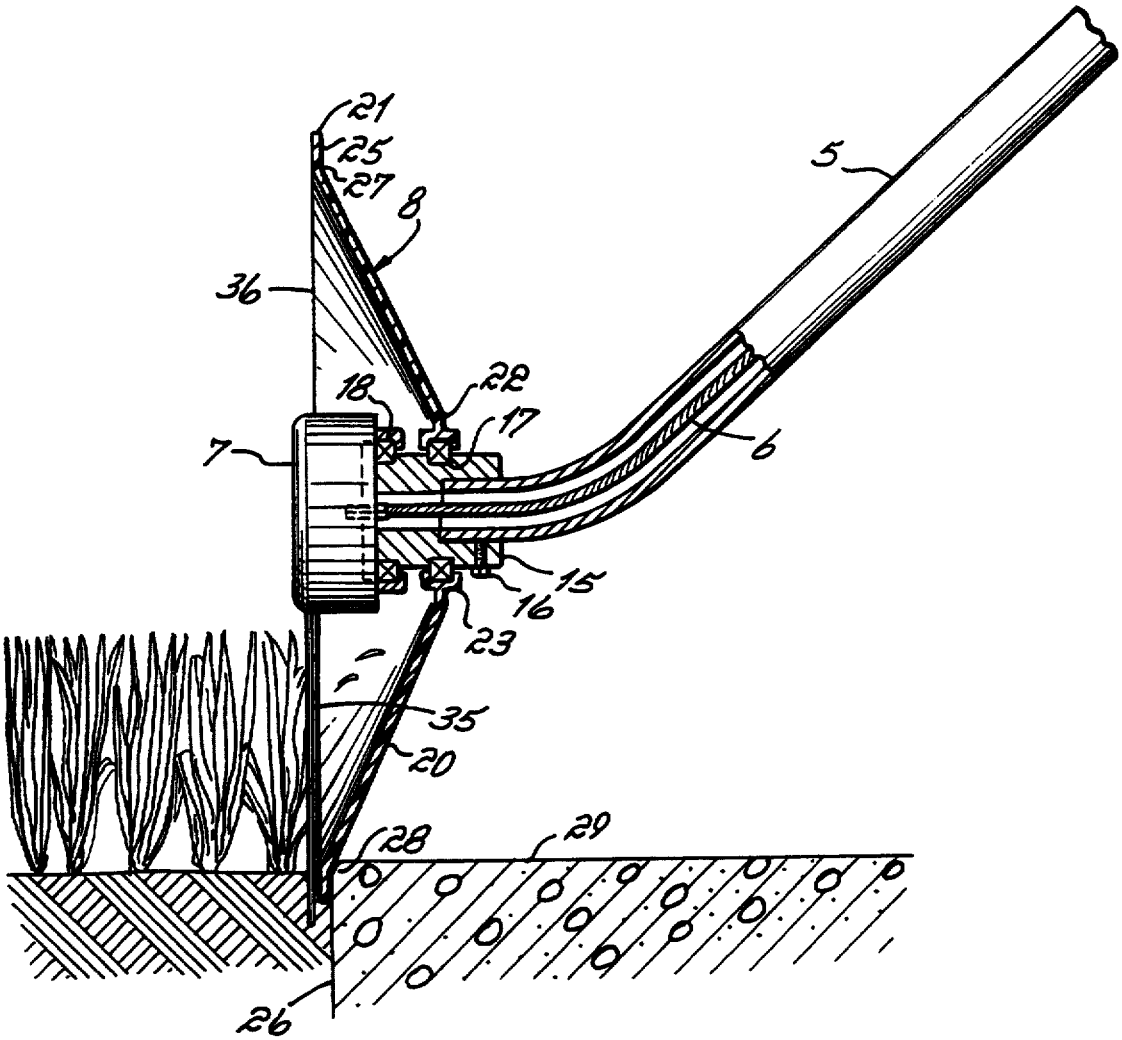
FIG. 2
FIG. 4
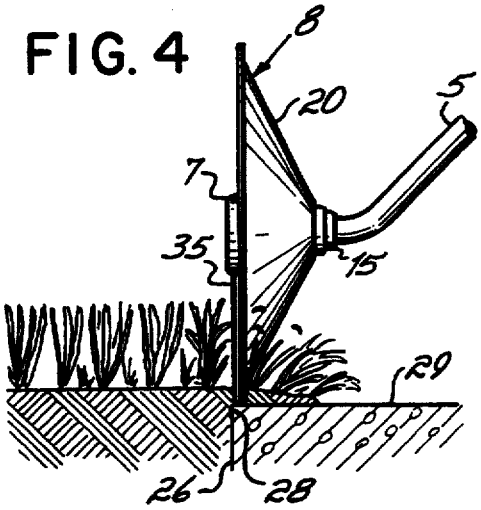
FIG. 5
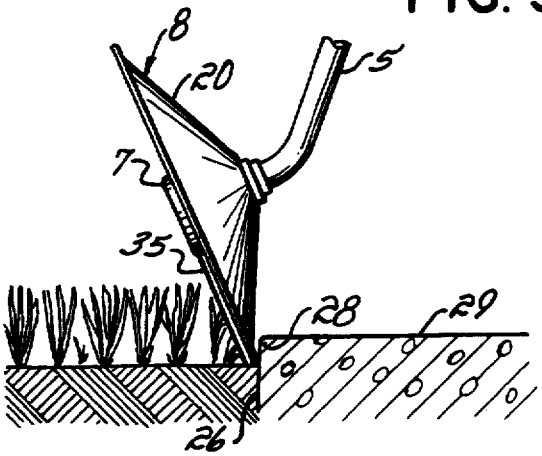

FLEXIBLE FLAIL TRIMMER WITH COMBINED GUIDE AND GUARD

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to flexible flail trimmers for trimming grass and weeds and for edging lawns, and more particularly to guiding such trimmers for edging and for guarding against thrown debris.

2. Description of the Prior Art

Flexible flail trimmers have become very popular. While initially used for trimming grass and weeds around trees, shrubs, fences and the like, they are now being used for many applications including the "edging" of sidewalks and curbs. This use serves a dual purpose. First, it eliminates the need for an additional piece of lawn care equipment, namely, a conventional rollable rotating blade edger. Secondly, it enables lawn care maintenance workers to trim around trees, shrubs and the like and to edge sidewalks and curbs without having to change equipment between operations. In otherwords, the flexible flail trimmer is becoming an "all-in-one" lawn care tool.

Nevertheless, the typical flexible flail trimmer is generally ill-suited for accurately edging along sidewalks and curbs where an edge line must follow and conform to the edge of the adjoining pavement or the like. When the turf edge protected by the edge is wavy or non-uniform, the finished appearance of the turf/pavement junction looks sloopy and is unacceptable.

To edge a sidewalk with a conventional flexible flail trimmer, a user must orient the plane defined by the rotating flail generally both vertically and perpendicularly to the sidewalk. The user must then walk down the sidewalk, advancing the trimmer while maintaining the vertical rotating flail plane generally co-planar with the vertical pavement surface of the sidewalk edge (proper horizontal orientation), and at the same time holding the disposition of the rotating flail tip generally adjacent the horizontal sidewalk surface at the sidewalk edge (proper vertical orientation). Most individuals lack the acute manual dexterity and eye-hand coordination necessary in order to successfully maintain these parameters to yield a uniform lawn edge, of proper depth, and at the sidewalk edge. The possible errors are compounded, of course, by the distance of the cutting flail from the position of the user's hands on the handle, the relationship of his hands or other handle support to each other, the overall balance of the trimmer, and the like.

In addition, using a flexible flail line trimmer in this manner can be dangerous for the user. The debris shields associated with traditional flail trimmers have not been designed not installed with this use in mind. For example, many flexible flail trimmers have shields which provide less than 360 degree circumferential coverage. When these types of trimmers are turned or oriented for use as an edger, the unshielded portion of the flail path is frequently directed towards the user. Also, many commercial lawn care workers simply remove the guard or shield altogether so as to better manipulate the trimmer during edging of sidewalks, leaving the entire circumference of the trimmer exposed.

Furthermore, it is extremely fatiguing for a user to stoop over and walk forwardly while attempting to maintain precise and accurate placement of the trimmer head while suspending it above the ground surface. This car easily lead to lower back strain.

Numerous devices have been proposed to address these difficulties. Many of these provide means for rolling a flexible flail trimmer along a curb or sidewalk to edge the grass adjacent thereto. Generally, these types of devices have some sort of bolt-on wheel arrangement wherein a flexible flail trimmer may be converted to a lawn edge. Such a combination effectively provides a user with physical feedback in a vertical plane, thereby eliminating the need to manually suspend the trimmer cutting head above the lawn while in a stooped position and hence ridding a user of low-back strain. Such devices are disclosed, for example, in U.S. Pat. Nos. 4,914,899; 4,803,831; 4,712,363; 4,679,385; 4,442,659; 4,224,784 and 3,788,049. These add-on devices, however, are generally cumbersome, expensive, and may in fact adversely effect the trimming operation of the trimmer when used in the traditional trimming manner.

Another flexible flail edging device is disclosed in U.S. Pat. No. 4,268,964. This device eliminates the bolt-on wheel arrangement for converting a flexible flail trimmer into a lawn edger. It instead utilizes a disk as a means for rollably supporting the trimmer against the horizontal sidewalk surface. This device has several advantages in that it eliminates the need for a bolt-on wheel arrangement, utilizes existing structure for rotatably supporting the flexible flail trimmer, and does not inhibit normal trimming of grass and weeds around trees, shrubs and the like, since the flail extends outwardly from the disk.

Nonethless, this apparatus for trimming and edging has several inherent problems. First, since the rotating shield or disc is outboard of the cutting head, the shield does not provide the user with any protection from airborne debris generated by the action of the cutting head, and the flail tips are not enclosed. While the shield may protect the rotating structure from hitting stones or other objects that might damage the rotating structure during conventional trimming, the cutting head is open to the user and could propel debris or objects in his direction.

In addition, this device has no means by which a user may guide the flexible flail trimmer in a straight line along a sidewalk or curb. While it does support the flail above the walk, there is no guidance or physical feedback in the horizontal direction. Accordingly, the uniformity of a turf edge obtainable by a user is limited by the manual dexterity and eye-hand coordination of the user. This device, while eliminating user lower back strain and providing a uniform depth of turf cut, does nothing towards aiding a user in delivering a uniform turf cut or edge parallel to or uniformly spaced from the sidewalk edge, which is the most important aesthetic aspect of sidewalk edging.

It has therefore been one object of the present invention to provide an improved flexible flail trimmer which can be used for cutting and trimming grass and weeds around trees, shrubs and the like and which also facilitates edging lawns positively and uniformly along sidewalks and curbs.

Another object of the present invention is to provide a combination flexible flail trimmer and lawn edger wherein the user is shielded effectively from airborne debris generated by the cutting head during any use.

Yet another object of the present invention has been to provide a flexible flail trimmer which can not only be used for cutting and trimming of vegetation around trees, shrubs, fences and the like but which may also be used for uniformly edging lawns along sidewalks and curbs without the need for adding accessory wheels or guide apparatus.

Yet a further object of the present invention has been to combine the capability of cutting and trimming of vegetation with uniform edging of sidewalks and curbs in a single apparatus.

Still a further object of the present invention has been to provide a flexible flail trimmer which, when operated as a lawn edger, will provide an aesthetically pleasing turf cut which uniformly tracks a sidewalk edge, whether straight or curved.

A further object of the present invention has been to provide apparatus for converting a flexible flail trimmer into a lawn edger for uniformly edging a lawn, while at the same time protecting a user from thrown debris and while retaining the trimming function of the apparatus.

SUMMARY OF THE INVENTION

A preferred embodiment of the present invention includes a trimming and lawn edging apparatus comprising a handle or shaft-like housing, a motor mounted on the handle, a rotating drive shaft extending from the motor through the handle for driving a cutting head at the far end of the handle, and a combined guide and guard rotatably mounted inboard the cutting head and having indexing means for guiding the apparatus in both horizontal and vertical directions. The rotating cutting head includes a flexible flail extending outwardly from the cutting head and being generally perpendicular to a rotational axis of the cutting head during operation. Since the combined guide and guard of the present invention is rotatably supported inboard of the cutting head, generally between the cutting head and user, it deflects thrown debris away from the user.

In one embodiment, the combined guide and guard is a truncated cone having a circumferential lip extending radially outward from the base of the cone. In another embodiment, the combined guide and guard is a truncated hemisphere having a circumferential lip extending radially outward from the base of the hemisphere.

Either of these two types of combined guide and guard are rotatably supported upon the lower or far end of the handle, via a bearing contained within the truncated element of the guide and guard. This allows the drive shaft to extend through the handle and the combined guide and guard to drive the cutting head completely independently of the guide and guard.

The flexible flail of the cutting head rotates in a plane which is generally parallel to and slightly outboard of a plane defined by an outboard face of the circumferential lip of the guide and guard. The end of the flail extends radially beyond the edge of this lip to provide the desired cutting action. During edging, as the trimmer is rolled forwardly, the flail extends forwardly or leads ahead of the guide and guard clearing a path in which the guard lip may fit. The outboard lip surface in effect provides a bearing surface against which the flail bears during rotation. It will be appreciated that the aerodynamic effects upon the flail rotating at high speed causes the flail to "wobble" this clearing a path which is wider than the flail itself. Ideally, the lip width would be less than the feed increment of the trimmer head so that the flail tip would wear away before that portion of the flail traveling adjacent the lip would wear through.

By orienting the axis of rotation of the cutting head generally parallel to a lawn surface, a user may uniformly edge a lawn in a straight line along a sidewalk. To accomplish this, and in one form of usage, the juncture of the lip with the base of the guide and guard is rolled along the sidewalk corner formed by its vertical edge and horizontal top surface. Thus the trimmer is indexed both vertically and horizontally to faithfully follow the sidewalk edge at uniform vertical depth and uniform horizontal distance, producing a neat, uniform, trimmed lawn edge.

When the trimmer is used at an angle, as when the soil is below the adjacent walk area, or when the trimmer is positioned to cut through soil and grass overlapping the walk, the disk's circumferential edge or lip supports the trimmer and the user rolls it along a straight line, following the path being cut by the leading flail.

In addition, the apparatus can be used without modification to trim, conventional style, grass, vegetation and the like when the axis of rotation of the cutting head is oriented generally perpendicular to the lawn.

While the combined guide and guard may be included on a flexible flail trimmer as original equipment, it may also be marketed as an after-market add-on device. As an after-market device the combined guide and guard would be fabricated as previously described.

One advantage of the present invention is that it provides a multiple use lawn care apparatus eliminating the reed for two separate pieces of equipment.

Another advantage of the present invention is that the time required to trim and uniformly edge a lawn may be reduced since a user can utilize a single dual-purpose piece of equipment and perform trimming and edging all in one operation.

Yet another advantage of the present invention is that a lawn care worker may safely trim and edge a lawn with a single piece of equipment, the debris shield of that piece of equipment being located so as to provide protection to the user during either operation.

Still another advantage of the present invention is that edging is enhanced since the flail plane is for all practical purposes identical to the guide/guard circumferential lip plane. Thus a user is not required to see the effectively invisible flail plane, but can treat the easy-to-see disk edge as indicating the cutting location and thus more easily control the trimmer in an "edging" operation. Visualization for the edging process is thus substantially improved.

Yet another advantage of the present invention is that edging may be accomplished faster than with a conventional bladed edger, which excavates a greater amount of soil thus slowing greatly the edging process.

Still a further object of the present invention is that less debris is generated during the edging process thus reducing clean-up time.

Still another advantage of the present invention is that less horsepower is required to perform edging than with a standard bladed edger since a lesser amount of soil is excavated during edging.

These and other objects and advantages of the present invention will more readily become apparent from the following description of the drawings, in which:

BRIEF DESCRIPTION OF THE DRAWINGS

FIG. 2 is an elevational cross-sectional view showing the functioning of the combined guide and guard of the present invention during sidewalk edging;

FIG. 4 is a view similar to FIG. 2 but where grass and soil has severely overlapped the sidewalk surface.

FIG. 5 is a view similar to FIG. 4 but where the grass and soil have receded below the sidewalk surface, and the trimmer is used at an angle for edging.

DESCRIPTION OF PREFERRED EMBODIMENTS

Figure 1:
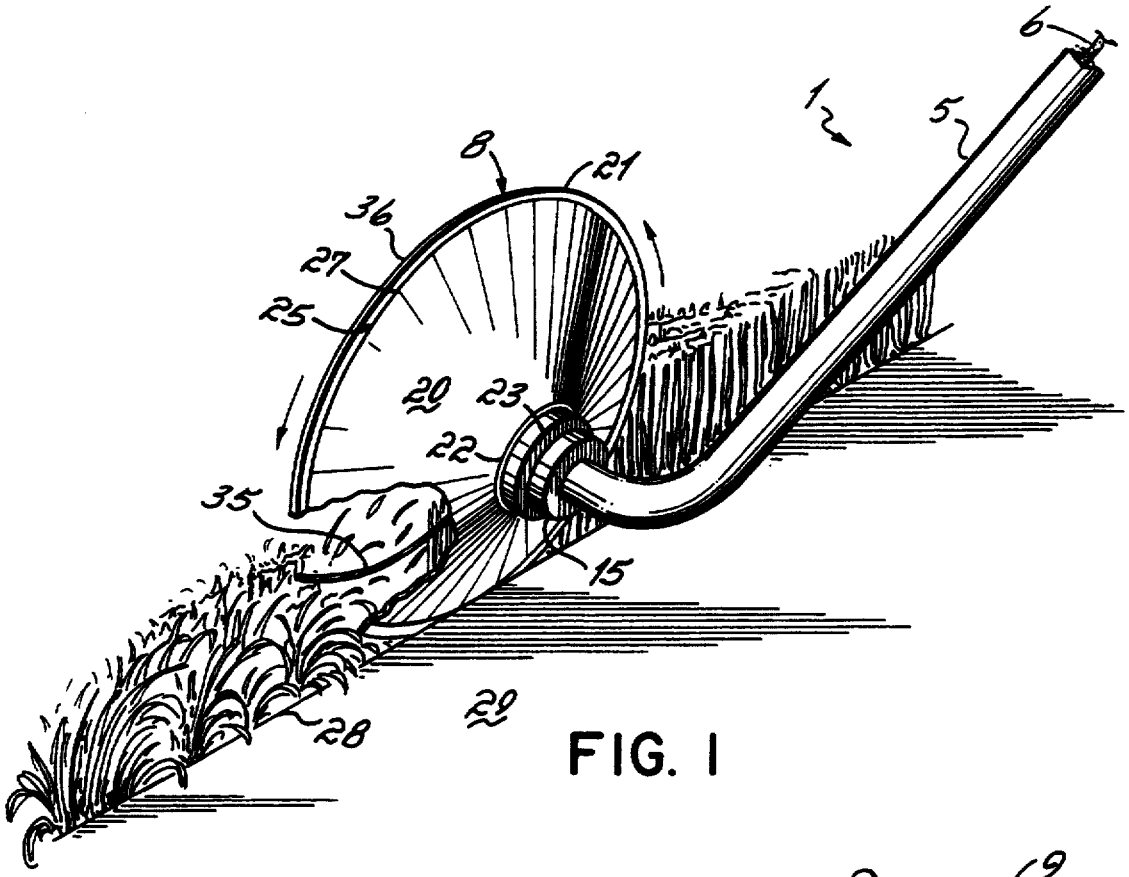
FIG. 1 is a perspective view of a portion of a flexible flail trimmer embodying the present invention.

Referring to the figures, a preferred embodiment of the invention includes a flexible flail trimmer 1 having a handle comprising a non-rotating or fixed hollow, tubular, shaft or housing 5, a rotating flexible drive shaft 6, a rotatable flail storage or cutting head 7 including a flexible flail 35, a combined dual function guide and guard 8 and a drive means such as an internal combustion engine 9 (FIG. 3), or a motor, for driving the drive shaft 6. Of course, the invention is easily also used with or adapted to a straight shaft, gear-head flexible flail trimmer.

The shaft or housing 5 includes a cylindrical housing 15 attached to a lower shaft end by way of a set screw 16. The cylindrical housing 15 provides a mounting structure for the combined guide and guard 8 and the flexible flail cutting head 7.

The combined guide and guard 8 has contained within its inner diameter a bearing 17 which encircles the cylindrical housing 15. The cutting head 7 has contained within an inboard side thereof a bearing 18 which also encircles the cylindrical housing 15. It will be appreciated that the cutting head 7 may be supported on a bearing which is internal to the cylindrical housing 15, rather than external, as shown. The flexible shaft 6 is fixedly attached to a flexible flail spool (not shown) of any conventional construction which may be self-feeding or otherwise adjustable and which is contained within the cutting head 7 in any conventional manner. The internal combustion engine 9 in turn drives the flexible drive shaft 6 and cutting head 7.

The combined guide and guard 8 rotates on housing 15 independently of the flexible drive shaft 6 and cutting head 7. In other words, while the flexible shaft 6 and cutting head 7 rotate, the combined guide and guard 8 *is annular and* may or may not rotate, depending on whether or not a user is rolling the combined guide and guard along the sidewalk edge.

Describing the combined guide and guard 8 now with more particularity, and referring to FIG. 2, it will be seen that the guide and guard 8 is mounted inboard of the cutting head relative to handle 5, and thus is disposed between cutting head 7 and a user grasping the handle shaft 5.

The combined guide and guard 8 is generally in the shape of a truncated cone 20, having a circumferential lip 21 extending radially outwardly from the base of the cone 20 and being truncated at the top 22 of the cone. This truncated area 22 includes a bearing receiving fixture, recess or configuration at 23 for encapsulating the aforementioned bearing 17 *which extends substantially continuously around the combined guide and guard 8 to provide 360 degrees coverage around cutting head 7.*

The flexible flail 35 of the trimmer head 7 rotates in a plane slightly outboard a plane defined by the outboard annulus surface 36 of the circumferential lip 21. Referring to FIGS. 1 and 2, which illustrate an "ideal" edging scenario wherein the sidewalk is frequently edged, it will be seen that the circumferential lip 21 of the combined guide and guard 8 includes an inboard surface 25 which may be indexed against a vertical sidewalk edge 26. The juncture of the circumferential lip 21 and the base of the cone 20 defines a juncture 27 which in edging use is preferably located on the corner 28 of the sidewalk formed by the vertical sidewalk edge 26 and the horizontal sidewalk surface 29. Of course, the juncture of the lip 21 and cone 20 can be configured in any manner suitable to provide a positive indexing of guide to sidewalk, such as by making the angle more acute, or the juncture of a different shape.

To edge a sidewalk, a user first lowers the trimmer 1 to the turf. As the trimmer is lowered and approaches the turf, the rotating flail 35 begins cutting the grass before the lip 21 of the guide and guard 8 reaches the turf. In this manner the trimmer 1 defines the lawn edge at the sidewalk edge. Next a user inserts the circumferential lip 21 of the combined guide and guard 8 between the sidewalk and turf, indexing the inboard lip surface 25 of the lip 21 against the vertical sidewalk surface 26, while indexing the juncture 27 between lip 21 and cone base 20 against the corner 28 of the sidewalk. As the flail 35 rotates, the user rolls the combined guide and guard 8 forwardly along the sidewalk edge, maintaining contact with the corner 28 of the sidewalk. The flail 35 extends forwardly or leads ahead of the guide and guard 8 clearing a path in which the lip 21 may fit. In this manner a user may speedily and without resort to eye-hand coordination, uniformly edge a sidewalk or curb.

However, the utility of the present invention is not limited to such an "ideal" edging scenario illustrated in FIGS. 1 and 2. While such a condition might exist for frequently edged areas, FIGS. 4 and 5 illustrate other frequently encountered situations.

With reference to FIG. 4, it will be seen that the trimmer 1 with combined guide and guard 8 is equally useful in edging a sidewalk in the extreme environment wherein the soil and grass has greatly encroached upon or overlapped the corner of the sidewalk 28. In this scenario, the circumferential lip 21 of the combined guide and guard 8 rides atop the horizontal sidewalk surface 29 closely adjacent the vertical sidewalk edge 26. The flail 35 is operable to cut through both grass and soil which has grown to cover the horizontal sidewalk surface 29.

The utility of the present invention in yet another extreme sidewalk edging environment is illustrated in FIG. 5. In this scenario, the soil and grass has receded below the horizontal sidewalk surface 29. Nonetheless, the trimmer 1 equipped with guide and guard 8 is effective to deliver a clean grass edge at the sidewalk corner 28 since the circumferential lip 21 may ride in the corner created by the vertical sidewalk edge 26 and the ground surface.

Figure 3:
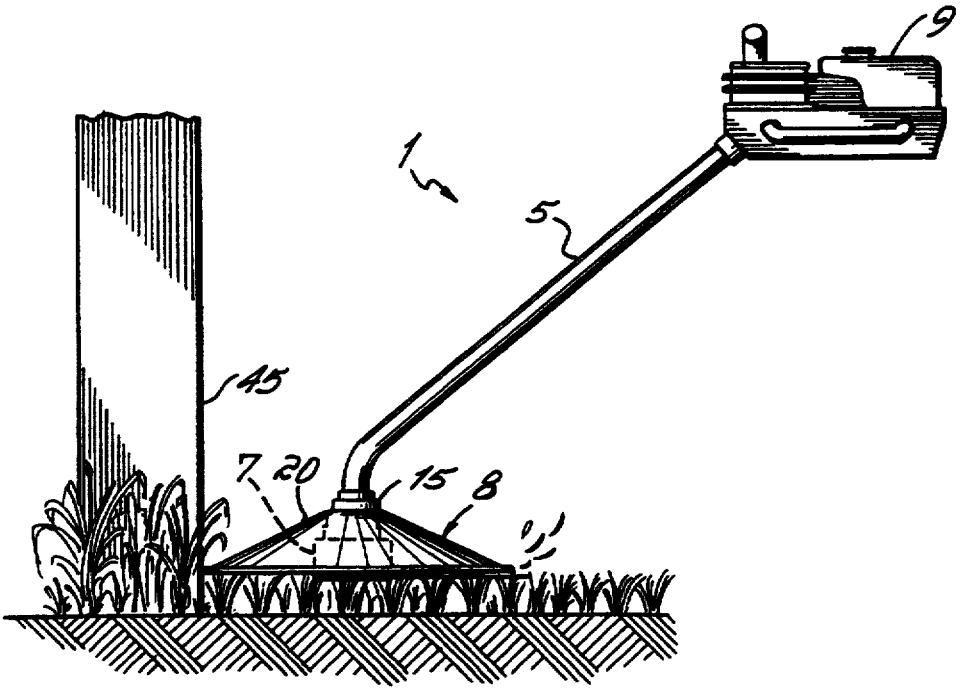
FIG. 3 is an elevational view showing the functioning of the combined guide and guard of the present invention during conventional trimming.

FIG. 3 illustrates use of the flexible flail trimmer 1 in conventional trimming mode. The user need merely orient the axis of rotation of the trimmer head 7 to a perpendicular orientation, with respect to the lawn surface, and maintain the outboard face of the combined guide and guard at the desired height above the ground surface. The trimmer 1 may be positioned closely adjacent a vertical object, such as wall 45, for neatly trimming grass adjacent thereto.

In all instances it will be appreciated that the leading flail 35 cuts a path in which the lip 21 of the guide and guard 8 may reside during edging. Thereafter, the guide and guard 8 may for all practical purposes be treated synonymously with the rotating flail plane for ease of visulization during edging.

While two geometric configurations of the combined guide and guard have been described, it will be appreciated that nearly any geometric configuration may be employed wherein the combined guide and guard is provided with features to index, or reference, a vertical surface and a horizontal surface. This will enable a user to maintain the guide and guard in constant contact with the corner edge of a sidewalk, or with other surfaces for production of a uniform edge. For example, a simple disk having a lip extending axially outwardly from the disk, at a short distance from the circumferential disk edge, would suffice. Or, a shallow cylinder with a circumferential lip extending radially outwardly would likewise suffice.

It will also be appreciated that the guide and guard can be supplied as original equipment with trimmers, or can be configured with proper bearings and fittings to be added to existing trimmers as an after-market add-on.

It should also be appreciated that the apparatus described produces a substantially vertical, or at the least a steep cut when edging, even when used in the FIG. 5 situation. This enhances lawn appearance over the prior lawns where flail trimmers were used to edge. In such prior situations it was common to see the flail plane used at a much shallower angle, cutting grass well behind the edge. Such shorter grass was not effective to prevent crabgrass growth and it has been common to see a green, crabgrass strip of grass running along a lawn edge near a curb. The steeper cutting angle, easily attainable with the invention, reduces or eliminates this problem.

While I have described one embodiment of the present invention those skilled in the art will readily recognize further advantages, adaptations and modifications without departing from the scope of the invention and I intend to be limited only by the claims appended hereto.

What is claimed is:

1. Apparatus for trimming and edging lawns comprising:

a handle having a first upper end and a second lower end, a drive means mounted on said handle proximate the upper end, a rotatable cutting head mounted proximate the lower end of said handle, a rotating driveshaft operably connected to and extending from said drive means to said cutting head for driving said cutting head, said rotating cutting head having flexible flail means, said flexible flail means extending outwardly from said cutting head and generally perpendicular to an axis of rotation of said cutting head during operation, and an integral guide and guard means rotatably supported on said apparatus inboard of said cutting head between said cutting head and said first end of said handle for guiding said cutting head and for shielding a user from debris generated by said cutting head, said integral guide and guard means being fully rotatable about said axis of rotation of said cutting head as said apparatus is moved along for trimming *and said integral guide and guard means further including an outboard generally planar flail stabilizing surface for bearing said flexible flail means as said flexible flail means rotates, said stabilizing surface being disposed within a path of rotation of said flexible flail means.*

2. The apparatus of claim 1 wherein said guide and guard means comprises a truncated cone element and a circumferential lip extending radially outward from a base of said truncated cone.

3. The apparatus of claim 1 wherein said guide and guard means comprises a circular structure generally concavely shaped on an outboard side thereof and generally convexedly shaped on an inboard side thereof and having a circumferential lip extending radially outward from an outboard edge of said structure.

4. The apparatus of either claim 2 or claim 3 wherein said second end of said handle comprises a tubular nonrotating housing and further including a bearing contained generally within said truncated element of said guide and guard means, said guide and guard means being rotatably mounted on said housing via said bearing, said driveshaft extending through said tubular nonrotating housing and bearing for driving said cutting head independently of said guide and guard means.

5. The apparatus of either claim 2 or claim 3 wherein said lip has an outboard face and wherein said flexible flail of said cutting head rotates in a plane generally parallel to and slightly outboard of a plane defined by said outboard face of said circumferential lip.

6. The apparatus of claim 5 wherein said lip defines a radial external circumferential lip edge and wherein said flail is oriented so that an outer end thereof is disposed adjacent said edge.

7. The apparatus of claim 6 wherein said cutting head axis of rotation is perpendicular to a plane defined by the path of said flail, said apparatus being operable to edge grass along a sidewalk and the like by orienting said axis of rotation of said cutting head generally parallel to a surface of said lawn, indexing an inboard face of said circumferential lip against a vertical sidewalk surface and indexing a juncture of said circumferential lip inboard face with an outer surface of said base along an elongated corner formed by said vertical sidewalk surface and a horizontal sidewalk surface, said guide and guard means being rollable along said sidewalk as said flexible flail rotates, thereby edging said grass uniformly adjacent said sidewalk.

8. The apparatus of claim 6, said apparatus being operable to trim grass, vegetation and the like by orienting said axis of rotation of said cutting head generally perpendicular to said lawn.

9. The apparatus of claim 5 wherein said flail tip extends radially beyond an edge of said circumferential lip.

10. A trimmer for edging grass along a fixed reference surface, said trimmer comprising a handle, a rotating flexible flail means operably mounted on an outboard end of said handle for cutting grass and weeds, driving means mounted on said handle for driving said flexible flail means, and a dual function flexible flail trimmer guide and guard means mounted on said trimmer inboard of said flexible flail means for guiding said flexible flail means along said reference surface while shielding a user from debris generated by said flexible line means, said guide and guard means being rotatably mounted on said trimmer for rotating through 360° as said trimmer is moved for edging *and said integral guide and guard means further including an outboard generally planar flail stabilizing surface for bearing said flexible flail means as said flexible flail means rotates, said stabilizing surface being disposed within a path of rotation of said flexible flail means.*

11. A grass and weed trimmer comprising a handle a rotating flexible flail means mounted to said handle for cutting grass and weeds, driving means on said handle for driving said flexible flail means, and a dual function flexible flail trimmer guide and guard means mounted on said trimmer and having vertical surface referencing means and horizonal surface referencing means and being operable to index said trimmer along a sidewalk to edge grass adjacent thereto while shielding a user from debris generated by said trimmer said guide and guard means being rotatably mounted on said trimmer so as to rotate when said trimmer is moved to cut grass and weeds *and said integral guide and guard means further including an outboard generally planar flail stabilizing surface for bearing said flexible flail means as said flexible flail means rotates, said stabilizing surface being disposed within a path of rotation of said flexible fall means.*

[12. A combined guide and guard means for use on a flexible flail grass and weed trimmer, said combined guide and guard means formed generally in the shape of a truncated cone having a circumferential lip extending radially outward from a base of said truncated cone and said guide and guard means including means for rotatably mounting said guide and guard means on a trimmer for rotation as said trimmer is used. ]

[13. A combined guide and guard means for use on a flexible flail grass and weed trimmer, said combined guide and guard means formed generally in the shape of a circular structure concavely shaped on an outboard side thereof and convexedly shaped on an inboard side thereof and having a circumferential lip extending radially outward from an outboard edge of said structure and said guide and guard means including means for rotatably mounting said guide and guard means on a trimmer for rotation as said trimmer is used.]

[14. The combined guide and guard means of either claim 12 or claim 13 wherein said mounting means includes a bearing for rotatably mounting said combined guide and guard means to a handle of said flexible flail trimmer.]

[15. The combined guide and guard means of claim 14 wherein said means includes means for mounting said guide and guard means on a flexible flail trimmer inboard of a cutting head thereof.]

[16. The combined guide and guard means of claim 14 wherein said lip is circumferentially continuous.]

[17. A combined guide and guard means for use on a flexible flail trimmer with a rotatable cutting head, said means including vertical surface referencing means and horizontal surface referencing means and being operable to index said trimmer along a sidewalk to edge grass adjacent thereto while shielding a user from debris generated by said trimmer and said guide and guard means including means for rotatably mounting said guide and guard means for rotation about an axis of rotation of said rotatable cutting head as said trimmer is used.]

[18. A method of trimming grass or weeds by means of a flexible flail trimmer having a cutting head mounted for rotation about an axis of rotation, a flexible flail extending radially therefrom for circular motion to cut grass or weeds, drive means for said cutting head and a handle on which said drive means and cutting head is mounted, the method comprising the steps of:

operating said trimmer to rotate said cutting head and flail;

orienting said trimmer to a position such that at least a cutting end of said flexible flail is brought into contact with grass or weeds to be trimmed;

said trimmer having a guide and guard means disposed adjacent said flail and inboard thereof with respect to said handle, said guide and guard means rotatably mounted on said trimmer for rotation about said axis of rotation; and said method including the further step of moving said trimmer so as to cause said combined guide and guard to rotate about said axis of rotation as said trimmer is moved to cut grass or weeds.]

[19. A method as in claim 18 wherein said trimmer is used for edging grass along a sidewalk, curb, or driveway, including the further step of rolling said guide and guard means in contact along and with a sidewalk, curb, or driveway adjacent grass to be edged and guiding said trimmer along said grass by means of said contact to edge said grass therealong.]

[20. A method of edging grass along a sidewalk, curb, or driveway with a flexible flail trimmer having a rotatable guide and guard means mounted for rotation about an axis of rotation, the method comprising the steps of:

rotating a flexible flail about said axis to cut grass;

rolling said guide and guard means along a surface adjacent grass to be edged to guide said trimmer therealong, said guide and guard means rotating about said axis; and deflecting thrown debris engaging said guide and guard means.]

*21. Apparatus for trimming and edging lawns comprising:*

*a handle having a first upper end and a second lower end,*

*a drive means mounted on said handle proximate the upper end,*

*a rotatable cutting head mounted proximate the lower end of said handle,*

*a rotating drive shaft operably connected to and extending from said drive means to said cutting head for driving said cutting head,*

*said rotating cutting head having flexible flail means,*

*said flexible flail means extending outwardly from said cutting head and generally perpendicular to an axis of rotation of said cutting head during operation, and*

*a combined guide and guard means supported on said apparatus inboard of said cutting head between said cutting head and said first end of said handle for guiding said cutting head and for shielding a user from debris generated by said cutting head,*

*said guide and guard means having an outer-circumferential edge defined by a circumferential lip extending radially outwardly therefrom, said circumferential lip having an outer periphery and a generally planar*

*outboard flail stabilizing surface for bearing said flexible flail means as said flexible flail means rotates, said stabilizing surface being disposed within a path of rotation of said flail means,*

*wherein said flail means extends radially outwardly from said outer periphery of said circumferential lip as said flail means rotates.*

*22. The apparatus of claim 21 wherein said flail means is mounted so as to extend substantially parallel to and slightly outboard said circumferential lip as said flail means rotates, such that said flail means bears against said lip during said rotation.*

*23. The apparatus of claim 22 wherein said circumferential lip extends substantially continuously around said guide and guard means to provide 360° coverage around said cutting head.*

*24. A trimmer for edging grass along a fixed reference surface, said trimmer comprising:*

*a handle,*

*a rotating flexible flail means operably mounted on an outboard end of said handle for cutting vegetation,*

*driving means mounted on said handle for driving said flexible flail means, and*

*a dual function flexible flail trimmer guide and guard means mounted on said trimmer inboard of said flexible flail means for guiding said flexible flail means along said reference surface while shielding a user from debris generated by said flexible flail means,*

*said guide and guard means having an outer-circumferential edge defined by a circumferential lip extending radially outwardly therefrom, said circumferential lip having an outer periphery and a generally planar outboard flail stabilizing surface for bearing said flexible flail means as said flexible flail means rotates, said stabilizing surface being disposed within a path of rotation of said flail means,*

*wherein said flail means extends radially outwardly from said outer periphery of said circumferential lip as said flail means rotates.*

*25. The apparatus of claim 24 wherein said flail means is mounted so as to extend substantially parallel to and slightly outboard said circumferential lip as said flail means rotates, such that said flail means bears against said lip during said rotation.*

*26. The apparatus of claim 25 wherein said circumferential lip extends substantially continuously around said guide and guard means to provide 360° coverage around said cutting head.*

*27. A grass and weed trimmer comprising:*

*a handle,*

*a rotating flexible flail means mounted to said handle for cutting vegetation,*

*driving means on said handle for driving said flexible flail means, and*

*a dual function flexible flail trimmer guide and guard means mounted on said trimmer and having vertical surface referencing means and horizontal surface referencing means and being operable to index said trimmer along a sidewalk to edge grass adjacent thereto while shielding a user from debris generated by said trimmer,*

*said guide and guard means having an outer-circumferential edge defined by a circumferential lip extending radially outwardly therefrom, said circumferential lip having an outer periphery and a generally planar outboard flail stabilizing surface for bearing said flexible flail means as said flexible flail means rotates, said stabilizing surface being disposed within a path of rotation of said flail means,*

*wherein said flail means extends radially outwardly from said outer periphery of said circumferential lip as said flail means rotates.*

*28. A grass and weed trimmer as claimed in claim 27 wherein said flail means is mounted so as to extend substantially parallel to said slightly outboard said circumferential lip as said flail means rotates, such that said flail means bears against said lip during said rotation.*

*29. The apparatus of claim 28 wherein said circumferential lip extends substantially continuously around said guide and guard means to provide 360° coverage around said cutting head.*

*30. Trimming and edging apparatus comprising:*

*flexible flail means for cutting vegetation rotatably mounted on said apparatus and extending radially therefrom,*

*guide and guard means mounted on said trimming and edging apparatus inboard of said flexible flail means and having a circumferential lip,*

*said guide and guard means having an outer-circumferential edge defined by a circumferential lip extending radially outwardly therefrom, said circumferential lip having an outer periphery and a generally planar outboard flail stabilizing surface for bearing said flexible flail means as said flexible flail means rotates, said stabilizing surface being disposed within a path of rotation of said flail means,*

*wherein said flail means extends radially outwardly from said outer periphery of said circumferential lip as said flail means rotates.*

*31. Trimming and edging apparatus as in claim 30 wherein said flail means is mounted so as to extend substantially parallel to and slightly outboard said circumferential lip as said flail means rotates, such that said flail means bears against said lip during said rotation.*

*32. The apparatus of claim 31 wherein said circumferential lip extends substantially continuously around said guide and guard means to provide 360° coverage around said cutting head.*

*33. Trimming and edging apparatus comprising:*

*flexible flail means for cutting vegetation, said flexible flail means being rotatably mounted on said apparatus and extending radially therefrom;*

*guide and guard structure mounted on said trimming and edging apparatus inboard of said flexible flail means said guide and guard structure having a generally planar flail stabilizing surface which lies within a path of rotation of said flail means such that said flail means contacts said generally planar flail stabilizing surface as said flail means wobbles during rotation.*

*34. Trimming and edging apparatus as in claim 33 wherein said generally planar flail stabilizing surface extends 360° around said guide and guard structure.*

*35. Trimming and edging apparatus comprising:*

*flexible flail means for cutting vegetation, said flexible flail means being rotatably mounted on said apparatus and extending radially therefrom;*

*guard means mounted on said trimming and edging apparatus inboard of said flexible flail means for protecting an operator from thrown debris during a trimming operation; and*

*said guard means comprising an outboard surface means for bearing said flexible flail means as said flexible flail means rotates, said outboard surface means being defined by a generally planar flail stabi-*

*lizing surface disposed within a path of rotation of said flexible flail means.*

*36. Trimming and edging apparatus as in claim 35 wherein said outboard surface means extends 360° around said guard means.*

*37. A trimmer for edging grass along a fixed reference surface, said trimmer comprising:*

*a handle,*

*a rotating flexible flail means operably mounted on an outboard end of said handle for cutting vegetation,*

*driving means mounted on said handle for driving said flexible flail means, and*

*a dual function flexible flail trimmer guide and guard means mounted on said trimmer inboard of said flexible flail means for guiding said flexible flail means along said reference surface while shielding a user from debris generated by said flexible flail means,*

*said guide and guard means having an outer-circumferential edge defined by a circumferential lip extending radially outwardly therefrom, said circumferential lip having an outer periphery and a generally planar outboard flail stabilizing surface for bearing said flexible flail means as said flexible flail means rotates, said stabilizing surface being disposed within a path of rotation of said flail means,*

*wherein said flail means extends radially outwardly from said outer periphery of said circumferential lip so as said flail means rotates, and clears a path ahead of the guide and guard means for receiving said lip as said trimmer advances.*

*38. A grass and weed trimmer comprising:*

*a handle,*

*a rotating flexible flail means mounted to said handle for cutting vegetation,*

*driving means on said handle for driving said flexible flail means, and*

*a dual function flexible flail trimmer guide and guard means mounted on said trimmer and having vertical surface referencing means and horizontal surface referencing means and being operable to index said trimmer along a sidewalk to edge grass adjacent thereto while shielding a user from debris generated by said trimmer,*

*said guide and guard means having an outer-circumferential edge defined by a circumferential lip extending radially outwardly therefrom, said circumferential lip having an outer periphery and a generally planar outboard flail stabilizing surface for bearing said flexible flail means as said flexible flail means rotates, said stabilizing surface being disposed within a path of rotation of said flail means,*

*wherein said flail means extends radially outwardly from said outer periphery of said circumferential lip as said flail means rotates, and clears a path ahead of the guide and guard means, said lip moving through said path as said trimmer is advanced.*

*39. Trimming and edging apparatus comprising:*

*flexible flail means for cutting vegetation, said flexible flail means being rotatably mounted on said apparatus and extending radially therefrom;*

*guide and guard means mounted on said trimming and edging apparatus inboard of said flexible flail means said guide and guard means having a generally planar surface which lies within a path of rotation of said flexible flail means such that said flexible flail means contacts said planar surface as said flexible flail means rotates, said flexible flail means having a tip extending beyond said planar surface and, when said flexible flail means is driven, clearing a path in said vegetation for said planar surface.*

*40. Trimming and edging apparatus comprising:*

*a flexible flail for cutting vegetation, said flexible flail being rotatably mounted on said apparatus and extending radially therefrom; and*

*guide structure mounted on said trimming and edging apparatus inboard of said flexible flail for guiding and stabilizing wobble of said flail as said flail rotates during a trimming operation, said guide structure including an outboard generally planar flail stabilizing surface for bearing said flexible flail as said flexible flail rotates, said stabilizing surface being disposed within a path of rotation of said flail.*

*41. Apparatus as claimed in claim 40 wherein said flail stabilizing surface includes a radially outer edge disposed proximate an outer end of said flail during said trimming operation.*

*42. A method of stabilizing wobble of a rotating flexible flail on a flexible flail trimmer, the method comprising the steps of:*

*providing flexible flail guide structure including a generally planar flail stabilizing surface having a radially outer edge;*

*mounting said guide structure on said trimmer inboard of said flexible flail such that said generally planar flail stabilizing surface faces in an outboard direction and bears said flexible flail as said flexible flail rotates, said guide structure further being mounted such that said stabilizing surface is disposed within a path of rotation of said flail.*

*43. A method as claimed in claim 42 further comprising mounting said guide structure such that a radially outer edge of said stabilizing surface is disposed proximate an outer end of said flail during said trimming operation.*

* * * * *